(12) United States Patent
Jones

(10) Patent No.: US 9,890,091 B2
(45) Date of Patent: *Feb. 13, 2018

(54) PERSISTENT VORTEX GENERATING HIGH REGRESSION RATE SOLID FUEL GRAIN FOR A HYBRID ROCKET ENGINE AND METHOD FOR MANUFACTURING SAME

(71) Applicant: Ronald D Jones, Indialantic, FL (US)

(72) Inventor: Ronald D Jones, Indialantic, FL (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/262,661

(22) Filed: Sep. 12, 2016

(65) Prior Publication Data

US 2017/0226026 A1    Aug. 10, 2017

Related U.S. Application Data

(63) Continuation-in-part of application No. 12/052,934, filed on Mar. 21, 2008, now Pat. No. 9,453,479.

(Continued)

(51) Int. Cl.
*F02K 9/72*    (2006.01)
*C06B 45/14*   (2006.01)
(Continued)

(52) U.S. Cl.
CPC .......... *C06B 45/14* (2013.01); *B29C 67/0055* (2013.01); *B33Y 10/00* (2014.12);
(Continued)

(58) Field of Classification Search
CPC ..... F02K 9/72; F02K 9/08; F02K 9/18; B29C 67/0051
See application file for complete search history.

(56) References Cited

U.S. PATENT DOCUMENTS 6,016,652 A * 1/2000 Smith ................. F02K 9/72
                                                    60/251
6,022,207 A * 2/2000 Dahlin ............. B29C 67/0055
                                                   242/563.2

(Continued)

OTHER PUBLICATIONS

Elliott et al, "Additive Manufacturing of Small Scale Rocket Grain Cartridges with Uniformly Distributed Aluminum Particles", AIAA Propulsion and Energy Forum, Jul. 25, 2016.*

*Primary Examiner* — Galen H Hauth
(74) *Attorney, Agent, or Firm* — John L. DeAngelis; Beusse, Wolter, Sanks & Maire

(57) ABSTRACT

An additively manufactured solid fuel grain for a hybrid rocket engine having a cylindrical shape, defining a center combustion port and comprising a stack of fused layers of polymeric material suitable for hybrid rocket fuel. Each layer is formed as a plurality of fused abutting concentric beads of solidified material arrayed around the center port. An oxidizer is introduced into the solid fuel grain through the center port, with combustion occurring along the exposed surface area of the solid fuel grain center port wall. Each concentric bead possesses a surface pattern that increases the combustion surface area and when stacked forms a rifling pattern of undulations that induces oxidizer-fuel gas axial flow to improve combustion efficiency. The port wall surface pattern persists during the rocket engine's operation as the fuel phase changes from solid to gas and is ablated.

19 Claims, 11 Drawing Sheets

Related U.S. Application Data

(60) Provisional application No. 60/896,296, filed on Mar. 22, 2007.

(51) Int. Cl.
| | | |
|---|---|---|
| *F02K 9/14* | (2006.01) | |
| *F02K 9/97* | (2006.01) | |
| *C06B 21/00* | (2006.01) | |
| *B29C 67/00* | (2017.01) | |
| *B33Y 10/00* | (2015.01) | |
| *B33Y 80/00* | (2015.01) | |
| *B33Y 70/00* | (2015.01) | |
| *B29K 55/02* | (2006.01) | |
| *B29K 105/16* | (2006.01) | |
| *B29K 505/02* | (2006.01) | |

(52) U.S. Cl.
CPC ............... *B33Y 70/00* (2014.12); *B33Y 80/00* (2014.12); *C06B 21/0033* (2013.01); *C06B 21/0075* (2013.01); *F02K 9/14* (2013.01); *F02K 9/97* (2013.01); *B29K 2055/02* (2013.01); *B29K 2105/16* (2013.01); *B29K 2505/02* (2013.01); *B29K 2995/0037* (2013.01); *F05D 2220/80* (2013.01); *F05D 2230/50* (2013.01)

(56) References Cited

U.S. PATENT DOCUMENTS 9,453,479 B1\* 9/2016 Jones .................. F02K 9/08
2011/0137578 A1\* 6/2011 Dietrich .................. G01N 3/08
702/43

\* cited by examiner

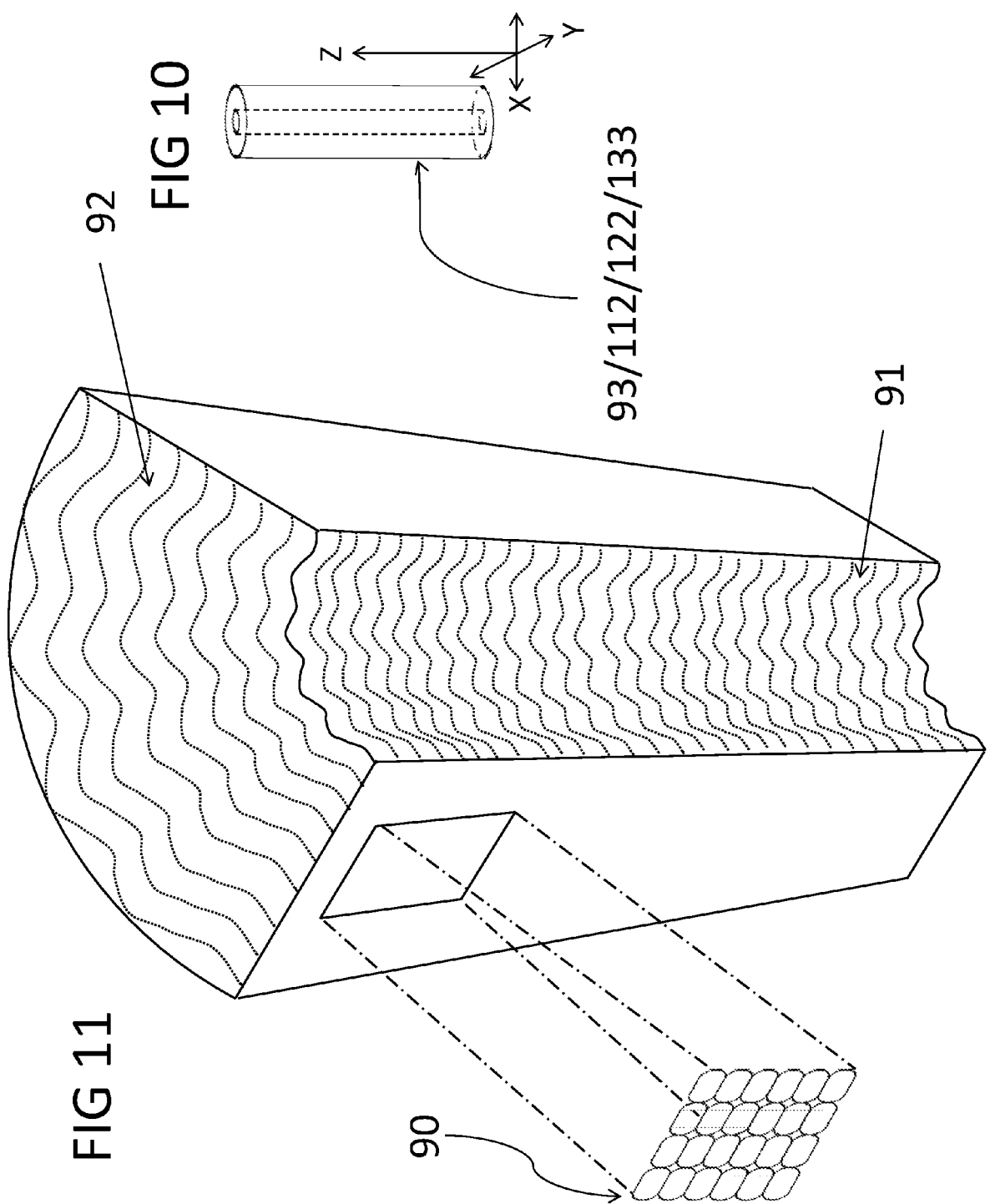

PERSISTENT VORTEX GENERATING HIGH REGRESSION RATE SOLID FUEL GRAIN FOR A HYBRID ROCKET ENGINE AND METHOD FOR MANUFACTURING SAME

CROSS-REFERENCE TO RELATED APPLICATIONS

This application is a continuation-in-part application of U.S. patent application Ser. No. 12/052,934 filed on Mar. 21, 2008 entitled Solid Fuel Grain for a Hybrid Propulsion System of a Rocket and Method for Manufacturing Same, now issued U.S. Pat. No. 9,453,479, which claims priority to the provisional patent application No. 60/896,296 filed on Mar. 22, 2007 of the same title. The entire disclosure of each one of these documents is incorporated herein by reference.

BACKGROUND OF THE INVENTION

The present invention relates generally to rocket propulsion systems and specifically to hybrid rocket engines. There are three basic types of chemical rockets in use today: liquid rocket engines that use liquid propellants, solid rocket motors that use solid propellants, and hybrid rocket engines that use a combination of liquid and solid propellants.

In a conventionally designed hybrid rocket engine, the fuel is stored in the solid phase, while the oxidizer is stored in either the liquid or gaseous phase. Traditionally in most hybrid rocket engine designs, the solid fuel is cast-molded, extruded, or in some instances machined into a cylindrically shaped structure referred to as a fuel grain. The fuel grain is designed and formed to feature one or more internal passages running through its length. These passages are referred to as ports. The fuel grain port or ports dually serve as the hybrid rocket engine's combustion chamber or chambers, and through a gas phase change and ablation process, the fuel source.

The fuel grain is conventionally housed within a metal or fiber-reinforced polymer composite motor case designed to withstand the pressures and elevated temperatures created during the combustion process. The motor case may also feature an internal liner made from a high-temperature material to create a thermal barrier to prevent damage or burn-through during the rocket engine's operation.

The motor case, with fuel grain installed, is attached to a forward cap typically machined or cast from high-temperature metal alloys. The forward cap forms the pre-combustion chamber and houses the oxidizer injectors and ignition system. The aft end of the motor case is attached to an assembly which forms the post combustion chamber and allows secure attachment to the rocket nozzle. The assembled motor case with fuel grain installed, forward cap, and aft assembly with attached nozzle is conventionally referred to as the motor or solid section of the hybrid rocket engine.

In a conventionally designed hybrid rocket engine, liquid or gaseous oxidizer is stored separately in an integrally formed pressure vessel or tank forward of the motor section within the rocket powered vehicle. However, in some designs, liquid or gaseous oxidizer may be stored adjacent to the motor section or even remotely on the vehicle. Conventionally, the tank or pressure vessel stored liquid or gaseous oxidizer is urged through a specially designed plumbing system, typically including a flow control valve to feed oxidizer through one or more oxidizer injectors housed within the motor section forward cap; and in turn, through the fuel grain port or ports.

The motive force needed to urge the liquid or gaseous oxidizer through the oxidizer injector or injectors into the fuel grain port or ports with sufficient flow rate to support combustion may be generated by any one of several means such as enabling a liquid to gas phase change, causing an exothermic reaction using a catalyst, employing a mechanical boost pump, pre-pressurizing the oxidizer tank with an externally supplied inert gas, or using an on-vehicle high pressure tank filled with an inert gas to boost oxidizer tank pressure.

Regardless of the configuration or type of liquid or gaseous oxidizer used, the assembly of oxidizer tank, pressurizing system and associated plumbing is typically referred to as the oxidizer section. Collectively, the motor section and the oxidizer section are referred to as the hybrid rocket engine, sometimes also referred to as the hybrid rocket motor.

Hybrid rocket engines offer certain advantages over both solid rocket motors and liquid rocket engines alike. For example, once ignited, a solid rocket motor cannot be stopped until its propellant is exhausted and it cannot be throttled or restarted. Hybrid rocket engines, like liquid rocket engines, can be designed for on-command thrust termination, throttling, and engine restart. Most liquid monopropellant rocket engines use highly toxic, environmentally damaging propellants that are now considered too dangerous and to environmentally unsafe for continued use.

Compared to most liquid bi-propellant rocket engines, hybrid rocket engines are significantly less mechanically complex, and therefore more reliable and less expensive to develop, manufacture, and operate. Hybrid rockets are ideally suited to use propellants that are self-pressurizing, non-toxic, environmentally benign, operate at ambient temperatures, and require no specialized equipment for handling, transporting, and loading. Furthermore, hybrid rocket engines, due to their propellants being stored in different states of matter, are inherently immune to explosion. Immunity to explosion is of great importance to rocket-powered vehicle designers and operators. Their superior safety, mechanical simplicity compared to liquid bi-propellant rocket engines, and environmental friendliness all translate to improved reliability as well as lower development, manufacturing, and operating costs.

Despite all of their aforementioned advantages, conventionally designed hybrid rocket engines using cast-molded solid fuels like hydroxyl-terminated polybutadiene (HTPB), a form of synthetic rubber that has been the most studied hybrid rocket engine fuel to date, are rarely if ever employed for applications requiring vibration free, consistent high performance. Unfortunately, conventionally designed hybrid rocket engines using cast-molded HTPB as well as other cast-molded solid fuels, including paraffin wax, polyamides, and thermoplastics have not been able to demonstrate the vibration free, consistent, high performance required for most rocket propulsion applications. All of these disadvantages and inefficiencies are attributable to either the solid fuel material selected or the fuel grain production methods used. To fully understand the efficacy and advantages of the present invention, it is important to understand these disadvantages in relation to competing rocket propulsion systems as well as their respective causes.

Comparative poor hybrid rocket engine performance and their often unpredictable, even sometimes dangerous nature can be attributed to: 1) low regression rate, the rate at which the solid fuel is consumed compared to a solid rocket motor, 2) adverse harmonics build-up inducing unacceptable, sometimes dangerous levels of vibration, 3) excessive solid fuel waste compared to other rocket propulsion systems, 4) low specific impulse (Isp) compared to most liquid bi-propellant rocket engines, and 5) inconsistent, unpredictable thrust performance which renders them unusable in clustered (multiple engines per launch vehicle stage or spacecraft) configurations.

1). Low Regression Rate.

For a given selection of fuels and oxidizer-to-fuel mass ratios, the thrust generated by a rocket or any type of reaction engine is approximately proportional to the mass flow rate. In a hybrid rocket engine, mass flow rate is proportional to fuel grain regression rate. In a classically designed hybrid rocket engine, particularly those using slow burning fuels like HTPB, the burning rate is further limited by the heat transfer from the relatively remote flame to the fuel grain port surface. One of the physical phenomena that limit the burning rate is the blocking effect that is caused by the injection of vaporizing fuel into the high-velocity oxidizer gas stream. Given the linear nature of the oxidizer gas stream, oxidizer/fuel vapor mixing and resulting combustion efficiency is a function of the amount of time available for mixing to occur within a classically designed hybrid rocket fuel grain port. To increase the amount of time mixing can occur, hybrid rocket fuel grains have been traditionally designed with a much higher aspect ratio compared to a comparable solid rocket motor fuel grain. Factoring in an allowance for an appropriately sized oxidizer tank and associated plumbing in tandem with a long-thin fuel grain, hybrid rocket engines are considered ungainly and not a viable option for many applications.

This difference in the combustion scheme of a hybrid rocket engine significantly degrades the propellant burning rate compared to a solid rocket motor propellant in which the solid state oxidizer and fuel are in intimate contact. Consequently, the regression rate, using conventionally molded fuel grain materials like HTPB is typically one-tenth or less than that of most solid rocket propellants.

Structurally soft, HTPB with a Young's Modulus varying between 0.0026 GPa and 0.00756 GPa is a common polymeric binder used in solid rocketry. It has been the fuel of choice for over fifty years in many U.S. Government sponsored hybrid rocket propulsion research projects. Most of this work has involved integrating multi-port configurations into the fuel grain's design to increase the total fuel grain port surface area as a means to improve regression rate. Unfortunately, improvements in regression rate using multi-port designs have been offset by reduced fuel volume loading, adverse harmonics built-up that induces excessive and sometimes dangerous levels of vibration, unpredictable thrust performance, and increased fuel waste. However, excessive vibration, unpredictable thrust performance, and increased fuel waste have also been observed in single port large hybrid rocket engine designs using both HTPB as well as faster burning, also structurally soft, paraffin wax with a Young's Modulus of 0.061 GPa. While it is generally understood that regression rate in a hybrid rocket engine is a function of fuel burn rate and port surface area, the increased regression rates achieved using multi-port grain configurations have been more than offset by reduced reliability, consistency, efficiency, and safety.

2) Adverse Harmonics and Excessive Vibration.

In any discussion about vibration in a hybrid rocket engine, it is important to keep in mind that the port within a hybrid rocket fuel grain is the engine's combustion chamber. Combustion chamber wall integrity is an essential design criterion in any reaction engine. Therefore, it is understandable that if a combustion chamber wall's structural integrity is degraded or compromised, chamber performance and reliability would likewise be degraded or compromised. Logically, an engineer would be reluctant to use a compressible, easily fractured material to fabricate a combustion chamber. But, this is exactly the case when soft, compressible, and fracture prone materials like HTPB and paraffin wax are used to construct a hybrid rocket fuel grain and its combustion chamber port or ports. To make matters more complex, given the fuel grain is also the rocket engine's fuel supply, as fuel is consumed, the port wall continually ablates and expands in diameter; thereby, increasing available surface area and oxidizer-fuel mixture shifts during the burn from oxidizer rich to fuel rich. Materials such as HTPB and paraffin wax are thought to respond to high pressure gases created within the port by compressing against the higher-strength motor case; thereby, inducing grain fractures and erosive burning—both common occurrences in large scale HTPB and paraffin wax hybrid rocket engines. Adverse harmonics exhibited in hybrid rocket engines, particularly pronounced in large-scale variants, is thought to be caused by a compressive-relaxation response by these soft fuels reacting to elevated chamber pressures, creating a type of trampoline effect. These oscillations can build to dangerous vibration levels and even a catastrophic over pressurization event. Cast-molded fuel grains made from these materials are also prone to structural flaws such as weak spots, air bubbles, hot spots, and fractures that are also known to cause erosive burning and erratic, unpredictable performance. Fuel fragments breaking free and blocking or temporarily blocking the rocket's nozzle have also been recorded. These phenomena are considered even more problematic in large hybrid rocket engines, especially those using multi-port designs.

3). Excessive Solid Fuel Waste.

A certain amount of residual solid fuel is expected in a hybrid rocket engine. However, in a multi-port configuration, the amount of non-combusted fuel that is expelled can be significant and in certain circumstances a safety concern. In multi-port designs, as the burn progresses and fuel is ablated and combusted, the structure between the ports ultimately losses its integrity until failure occurs. In these situations, chunks of non-combusted fuel and webbing material have been known to break free, partially and sometimes completely blocking the nozzle, which can cause a serious safety problem. In multi-port HTPB fueled hybrid rocket engine designs, the total amount of residual and unspent fuel can reach 15% or more.

4). Poor Specific Impulse.

Expressed in seconds, specific impulse (usually abbreviated Isp) is a measure of the efficiency of rocket and jet engines. By definition, it is the total impulse (or change in momentum) delivered per unit of propellant consumed and is dimensionally equivalent to the generated thrust divided by the propellant flow rate. Typically referenced as performance in vacuum for rockets, Isp is a convenient metric for comparing the efficiency of different rocket engines for launch vehicles and spacecraft.

Generally speaking, there is an inverse relationship between increased regression rate and Isp in a hybrid rocket. Whereas, regression rate speaks to the hybrid rocket engine's volumetric efficiency and thrust output as a function of fuel grain diameter, Isp relates more to the rocket engine's propellant efficiency. Ideally, rocket engine designers attempt to improve both. However, attempts to improve on hybrid rocket Isp has mainly focused on evaluating and testing different propellant combinations. Whereas, a classical hybrid rocket engine uses a liquid or gaseous oxidizer and solid fuel, past experiments have been conducted on engine's that use a solid oxidizer and liquid fuels. While many of these achieved very high Isp—in the high 300 seconds (vacuum), they proved to be impractical for reasons mostly associated with the need to maintain a hydrocarbon fuel as a solid at cryogenic temperatures.

Other approaches have involved blending energetic materials such as aluminum powder into the fuel grain composition to increase Isp. However, obtaining a consistent, uniform mixture has always been a challenge using cast-molding techniques, especially when molding multi-port grains. Most conventionally designed hybrid rocket engines using nitrous oxide and polymeric fuel like HTPB average Isp is between 270 seconds to 290 seconds (vacuum), the higher figure attained with the addition of aluminum powder as an additive. While higher than most solid rocket motors, this level of performance is significantly lower than competing liquid bi-propellant systems using liquid oxygen and hydrocarbon fuels like kerosene that average between 310-340 seconds.

5). Inconsistent Thrust Performance.

Inconsistent, unpredictable thrust in a classical hybrid rocket engine is a direct consequence of all of the above listed shortcomings and problems. Inconsistent and unpredictable performance makes it impossible for a hybrid rocket engine to be seriously considered for most rocket propulsion applications and uses. Further, many of the causes of inconsistent thrust performance can be tied to the cast-molding production process used to fabricate hybrid rocket fuel grains. HTPB and paraffin wax fuel grains are centrifugally cast-molded, with the latter containing a small percentage of polyethylene to improve tensile strength. During the HTPB polymerizing process, small air bubbles are formed and hot spots are created due to incomplete mixing and uneven curing. HTPB fuel grains require up to 90 days or more to fully cure, and even then, their material characteristics change over time. Small air bubbles are also formed during the cooling cycle when fuel grains are cast from paraffin wax. Bubble formation is a function of the shrinkage occurring within the wax. In an attempt to reduce or eliminate unwanted air bubbles as well as other types of grain flaws and hot spots, centrifugal casting methods, taking up to 120 hours to complete, are routinely employed. Even with these measures, air bubbles, structural cracks, hot spots, and other flaws seem to be chronic for fuel grains made using the cast-molding process.

Therefore, it would be highly desirable to develop a solid fuel propellant and fuel grain architecture-topology that exhibits: 1) flawless composition, 2) a regression rate comparable to solid rocket motors, 3) significantly improved thrust consistency, 4) more thorough oxidizer-fuel mixing, 5) improved specific impulse, and 6) minimal vibration—all without compromising the many safety, mechanical simplicity, and economic advantages inherent in hybrid rocket propulsion systems.

SUMMARY OF THE INVENTION

The invention comprises an additively manufactured solid fuel grain for a hybrid rocket engine having a cylindrical shape featuring a center combustion port, comprised as a stack of fused layers fabricated from a material suitable as a hybrid rocket fuel. Each layer is formed as a plurality of fused abutting concentric ring-shaped beads of solidified material of increasing radii arrayed around the center port. An oxidizer is introduced into the solid fuel grain through the center port, with combustion occurring along the exposed surface area of the solid fuel grain center port wall. Each concentric ring-shaped bead of fuel grain material possesses an undulating or irregular circular geometry, the plurality of which forms a surface pattern designed to increase the amount of surface area available for combustion, and in when fusion stacked also forms a rifling pattern that induces oxidizer-fuel gas axial flow to improve combustion efficiency. The fuel grain thus fabricated employs an internal topology that both presents increased port wall surface area to the flame zone while inducing axial oxidizer-fuel gas flow in a manner that persists during the rocket engine's operation; and depending upon the solid fuel selected, either phase changes from solid to a gas or from solid to entrained droplets, and is subsequently ablated. The solid fuel grain is preferably manufactured using any one of a variety of additive manufacturing machine technologies and techniques.

The present invention is a solid fuel grain for a hybrid rocket engine and a method for manufacturing same; and, more particularly, a solid fuel grain manufactured using additive manufacturing machine technology. Additive manufacturing (also referred to as 3D printing or archaically as freeform-fabrication) is the official industry standard term (ASTM F2792) for all applications of the technology. It is defined as the process of joining materials to make objects from 3D model data, usually layer upon layer, as opposed to subtractive manufacturing methodologies. An exemplary solid fuel grain suitable for use in a hybrid rocket engine and made in accordance with the present invention has a generally cylindrical shape and defines a center port that runs axially through its length. The solid fuel grain is formed as a fused stack of layers with each such layer comprising a plurality of abutting fused concentric, generally circular, beads of material suitable as a hybrid rocket fuel, each such concentric generally circular shaped bead formed, depending upon the additive manufacturing process used, as a ring with a defined cross sectional shape. The plurality of ring-shaped beads is configured in a concentric pattern of increasing radii arrayed around the center port or center opening.

After being loaded into a hybrid rocket engine's solid section, concurrent with ignition actuation to elevate the temperature within the center port above the solid fuel's ignition or glass transition temperature, a liquid or gaseous oxidizer is introduced into the solid fuel grain through one or multiple injectors along a pathway defined by the center port causing a thin layer of the center port wall to phase change.

Depending upon the type of solid fuel used, phase change will occur either from a solid to a gas or from a solid to entrained liquid droplets along the exposed surface area of the solid fuel grain port wall. The resulting gaseous or entrained liquid fuel then mixes with the oxidizer to form a oxidizer/fuel mixture suitable for hybrid rocket engine combustion. The resulting combusted reaction mass is expelled at high temperature and pressure through the rocket engine's nozzle (conventional de Laval or aerospike) at supersonic speed to generate thrust.

Each concentric solidified ring-shaped bead of material possesses a geometry that is designed to expose more fuel surface along the center port wall for combustion than would otherwise be possible if the center port wall were of a smooth, uniform cast-molded design. Starting with the center port wall and working outward, each beaded concentric ring structure, after undergoing phase change and ablation, is replaced by the next abutting beaded concentric ring structure. This process is repeated and persists throughout the rocket engine's operation until either oxidizer flow is terminated or the solid fuel is exhausted Unlike prior art constructions that attempt to increase regression rate using cast-molded multi-port grain architecture featuring smooth port walls at the sacrifice of fuel loading, increased fuel waste, and induced excessive vibration, the additively manufactured solid fuel grain of the present invention supports smooth, consistent rocket engine operation at regression rates previously unobtainable in a single port design. Further, by replacing cast-molding production methods with additive manufacturing methods, grain flaws chronic to both cast-molded fuel grains made from HTPB and paraffin wax are eliminated.

Another exemplary solid fuel grain suitable for use in a hybrid rocket engine and made in accordance with the present invention is formed as described in the above exemplary example, but with each concentric beaded ring structure possessing a pattern that both increases the surface area available for combustion and creates, in its plurality of fused stacked layers, a rifling type pattern within the port wall designed to induce oxidizer swirling flow around the center port axis line rather than laminar or streamline flow; thereby, creating a vortex within the center port to enable oxidizer and gaseous fuel to spend more time within the center port to mix and combust more thoroughly than would otherwise be possible.

Again, as in the above exemplary example, the pattern thus engineered into the fuel grain topology will persist throughout the rocket engine's operation until either oxidizer flow is terminated or the solid fuel is exhausted. Prior art constructions have employed swirling type oxidizer injectors to induce vortex flow. However, this prior art technique is only partially effective as it cannot generate axial flow throughout the length of the fuel grain and its center port.

In another prior art embodiment, rifling patterns have been imprinted onto the molded fuel grain's port wall as a means to induce axial oxidizer-fuel gas flow. Unfortunately, any vortex generated in this manner is only momentary due to the surface pattern being quickly ablated and not repeated.

In contrast, the solid fuel grain of the present invention supports smooth, consistent rocket engine operation at regression rates previously unobtainable in a single port design while improving Isp by enabling more complete oxidizer-fuel mixing and combustion while significantly reducing the amount of wasted fuel. More thorough combustion and higher Isp enables hybrid rocket engine designers the opportunity to design hybrid rocket engines with reduced fuel grain aspect ratio as well as with lower oxidizer loading to meet dimensional restrictions and performance requirements for rocket propulsion applications that previously could not consider a hybrid rocket engine.

To achieve such a construction, the solid fuel grain is preferably manufactured using any one of several available additive manufacturing machines capable of fabricating articles in materials suitable for hybrid rocket fuel such as polymers and polymer-metal blends.

DESCRIPTION OF THE DRAWINGS

FIG. 10 depicts the coordinate system and orientation of the fuel grain for use with FIGS. 11-14.

FIG. 11 depicts a quarter sectional view of the fuel grain section of FIG. 1 featuring a concentric corrugation topology grain pattern.

DETAILED DESCRIPTION OF THE INVENTION

Figure 1:
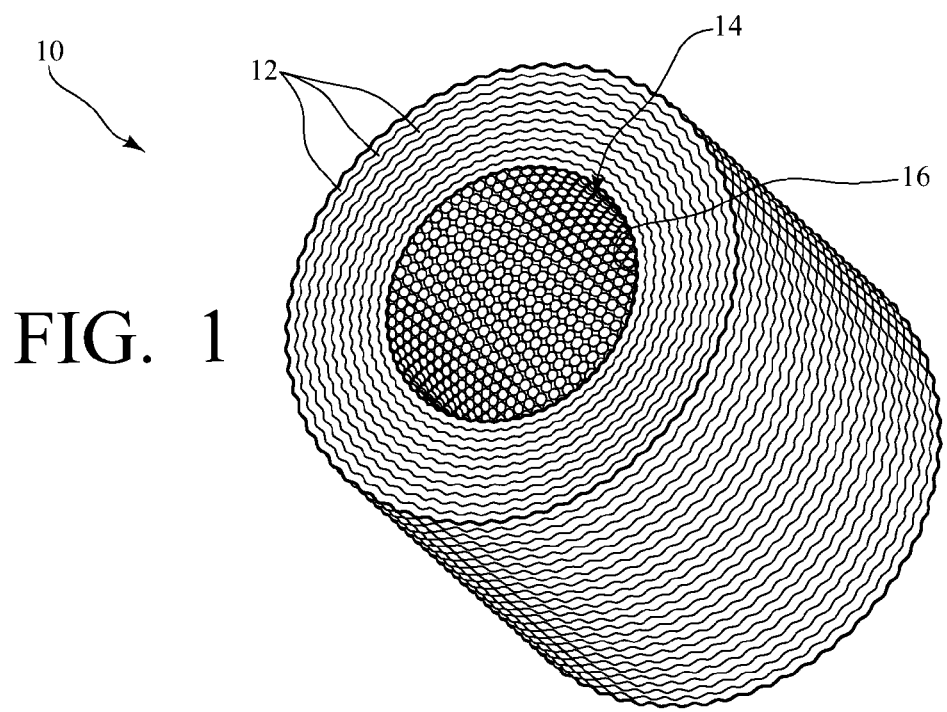
FIG. 1 is a perspective view of a solid fuel grain section made in accordance with the present invention.

The present invention is a solid fuel grain for a hybrid rocket engine and a method for manufacturing same; and more particularly, a solid fuel grain manufactured using an additive manufacturing machine.

FIGS. 1-3 and FIGS. 11-14B are various views of exemplary solid fuel grain sections 10/92/110/120/132 suitable for use in a hybrid rocket engine and made in accordance with the present invention. The fuel grain section 10 of FIGS. 1-3 has a generally cylindrical shape and defines a center port 16. In this exemplary embodiment, the center port 16 has a substantially circular cross-section, but the center port 16 could have other geometries, such as a star or clover leaf, without departing from the spirit or scope of the present invention.

More importantly, the solid fuel grain section 10 is formed as a fusion stacking of layers with each such layer formed as a series of abutting fused concentric ring-shaped beads of solidified material 12 arrayed around the center port 16. As is further described below, when incorporated into a hybrid rocket engine, an oxidizer is introduced into the solid fuel grain section 10 along a pathway defined by the center port 16 (also referred to as the center combustion port), with combustion occurring along the exposed surface area of the solid fuel grain section 10 port wall. Accordingly, each concentric ring-shaped bead structure possesses a geometric pattern 14 that serves to increase the surface area for combustion compared to a smooth concentric circular structure or smooth walls as consistent with cast-molded constructions. As each such concentric ring-shaped bead structure undergoes phase change from either solid to gas or solid to entrained liquid droplet, the abutting concentric bead is exposed to the flame sheet. This process continues and persists during the hybrid rocket engine's operation until either oxidizer flow is terminated or the solid fuel is exhausted. Unlike prior art constructions that improve regression rate by increasing the surface area exposed to the flame sheet using a multi-port architecture at the sacrifice of fuel loading, the solid fuel grain of the present invention presents increased surface area as a means to improve regression rate, but without the disadvantages associated with multi-port configurations.

Although the fuel grain section 10 may be manufactured in various sizes or dimensions, in this exemplary embodiment, the fuel grain section 10 has an outer diameter, d2, of 19.0 inches. Although a wide range of diameters and fuel grain lengths (or sectional lengths) are possible, the center port 16 has an initial diameter, d1, of 4.0 inches in this exemplary embodiment (although a larger diameter is shown FIG. 3 to enable a better view of the interior of the fuel grain section 10).

Each of the stacked fused layers in this exemplary embodiment would have an approximate thickness ranging from 0.005 inches to 0.015 inches depending upon the additive manufacturing machine layer setting or extrusion dye used, as is further described below.

In this exemplary embodiment, each of the stacked layers 12 is formed by the deposition of viscous polymer which is extruded following a roughly circular tool path forming a plurality of solidified abutting ring-shaped beads of material. In the embodiment of FIG. 11, when viewed in cross section each ring-shaped bead of solidified material 90 is oval or elliptical in cross sectional shape, which flattens on its bottom under its own weight as the material cools and flattens on the top as the weight of the next extruded layer of abutting ring-shaped beads of material is deposed above it.

Figure 2:
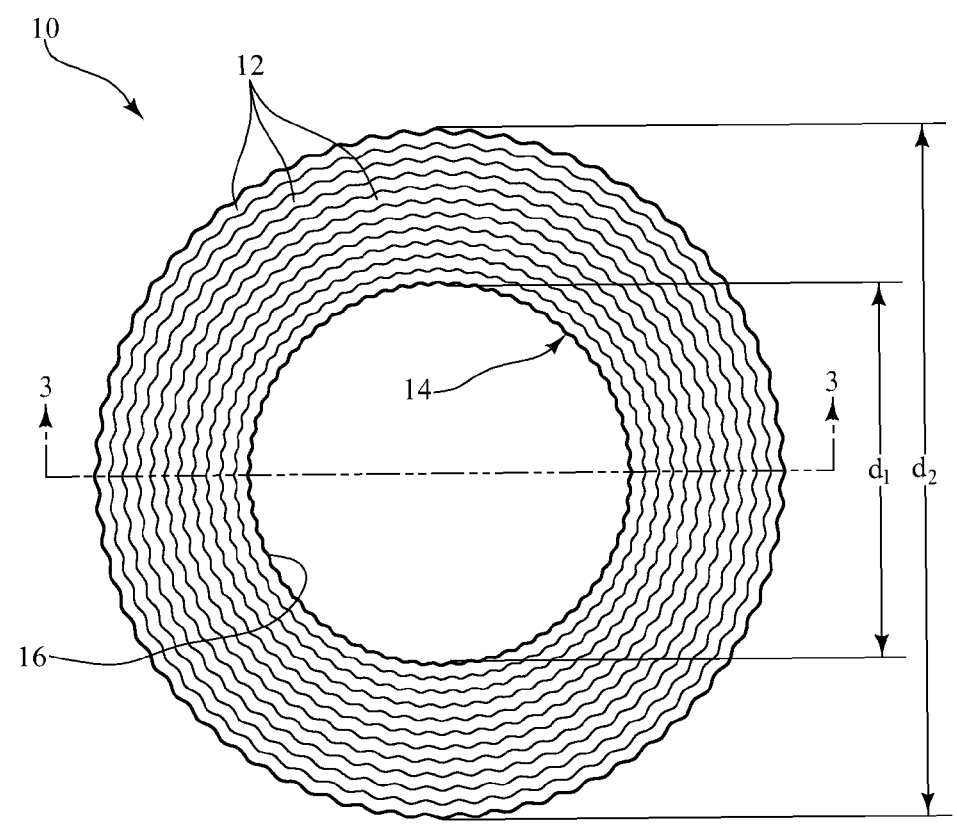
FIG. 2 is a top view of the solid fuel grain section of FIG. 1.
Figure 3:
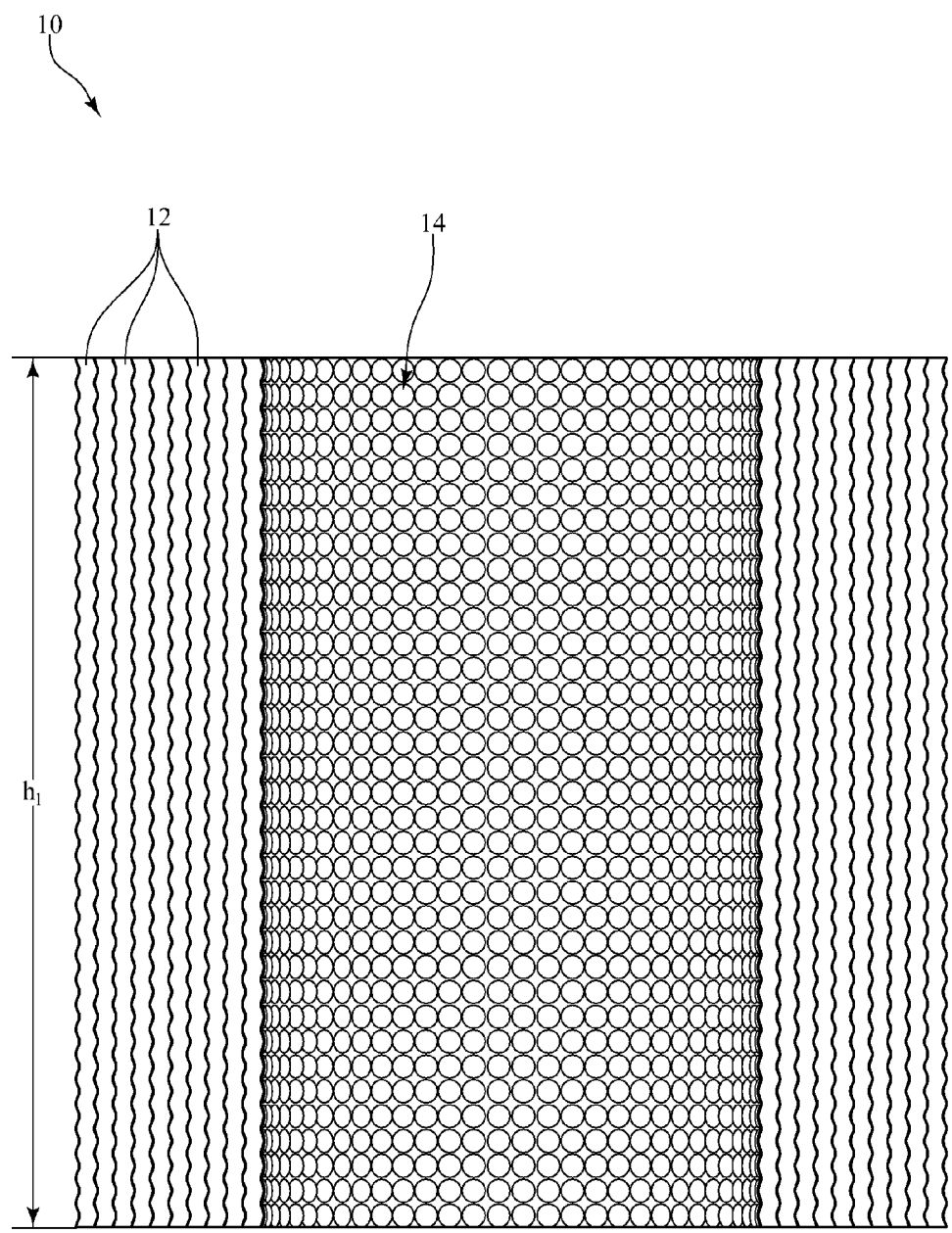
FIG. 3 is a sectional view of the grain section of FIG. 1, taken along line 3-3 of FIG. 2.

As for the concentric ring-shaped beaded structures thus fabricated, as stated above, the objective is to increase the surface area presented to the flame zone for combustion within the center port 16 in a manner which is persistent throughout the hybrid rocket engine's operation. In this exemplary embodiment, and as illustrated in FIGS. 1-3, the surface pattern presented to the flame zone is characterized by a series of projections and depressions extending radially into the center port, in this case forming elongated undulations that extend axially through the center port. These undulations are present in each concentric circular ring-shaped beaded structure such that as one ring-shaped beaded structure is ablated, the next-presented ring-shaped beaded structure is revealed presenting the same geometric pattern, but with an increased radius.

Figure 12:
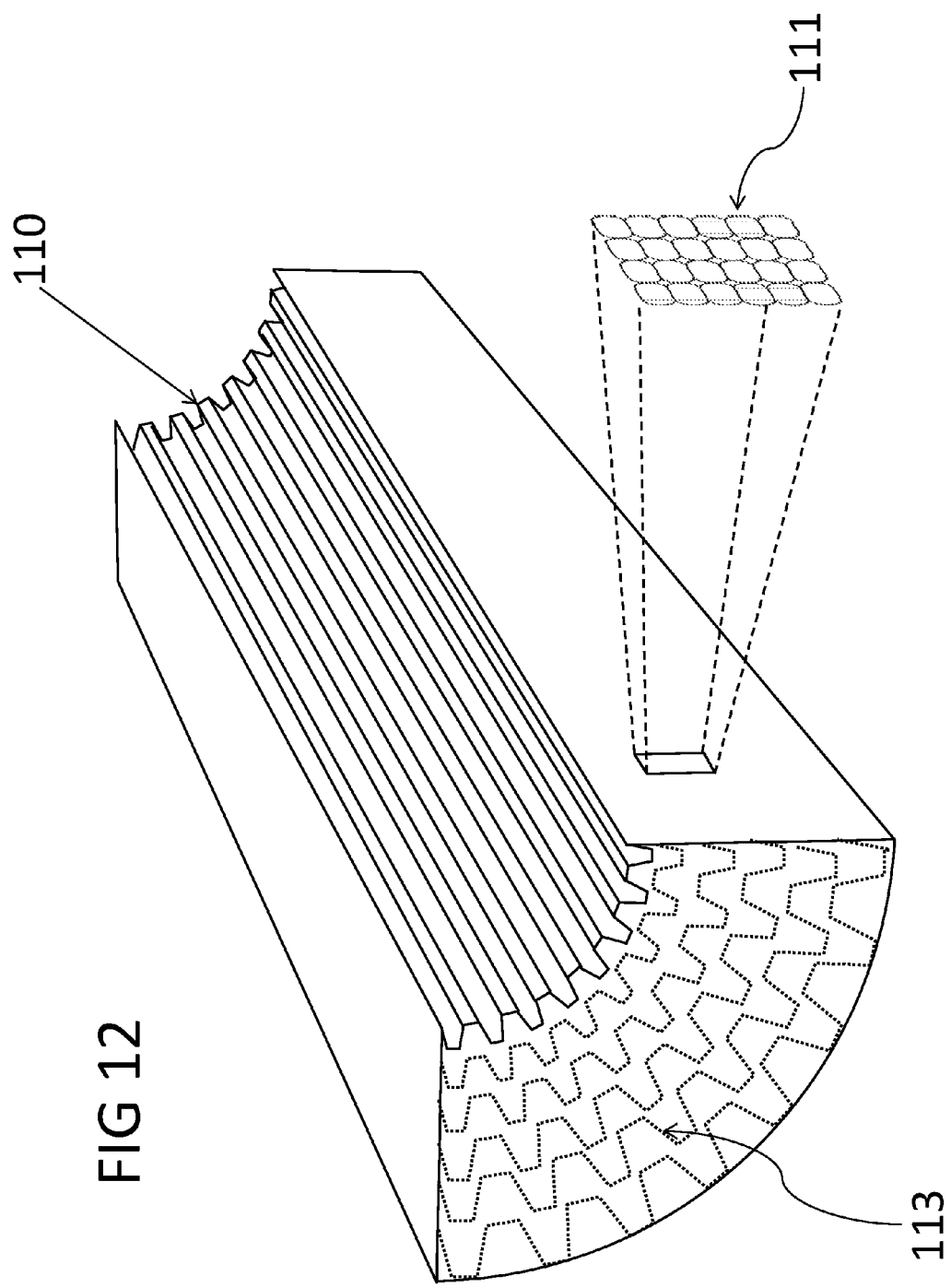
FIGS. 12 and 13 depict quarter sectional views of the fuel grain section of FIG. 1 featuring a concentric rifled truncated pyramidal topology grain pattern.

In FIGS. 1-3 as well as in FIGS. 11-14B, the individual undulations are identifiable and have a substantially cylindrical shape. However, in practice, depending upon the scale and layer thickness, such internal topology can take the form of a dimple pattern 14 as shown in FIGS. 1-3, a corrugation pattern 92 as shown in FIG. 11, and a truncated pyramidal pattern 110 as shown in FIG. 12, all of which may or may not be perceptible to a viewer's unaided eye. Alternatively, the geometric pattern 14, 92, 110 of each ring-shaped concentric beaded structure may take other forms in order to achieve the objective of increasing the surface area available for combustion that persists throughout the hybrid rocket engine's operation.

Figure 13:
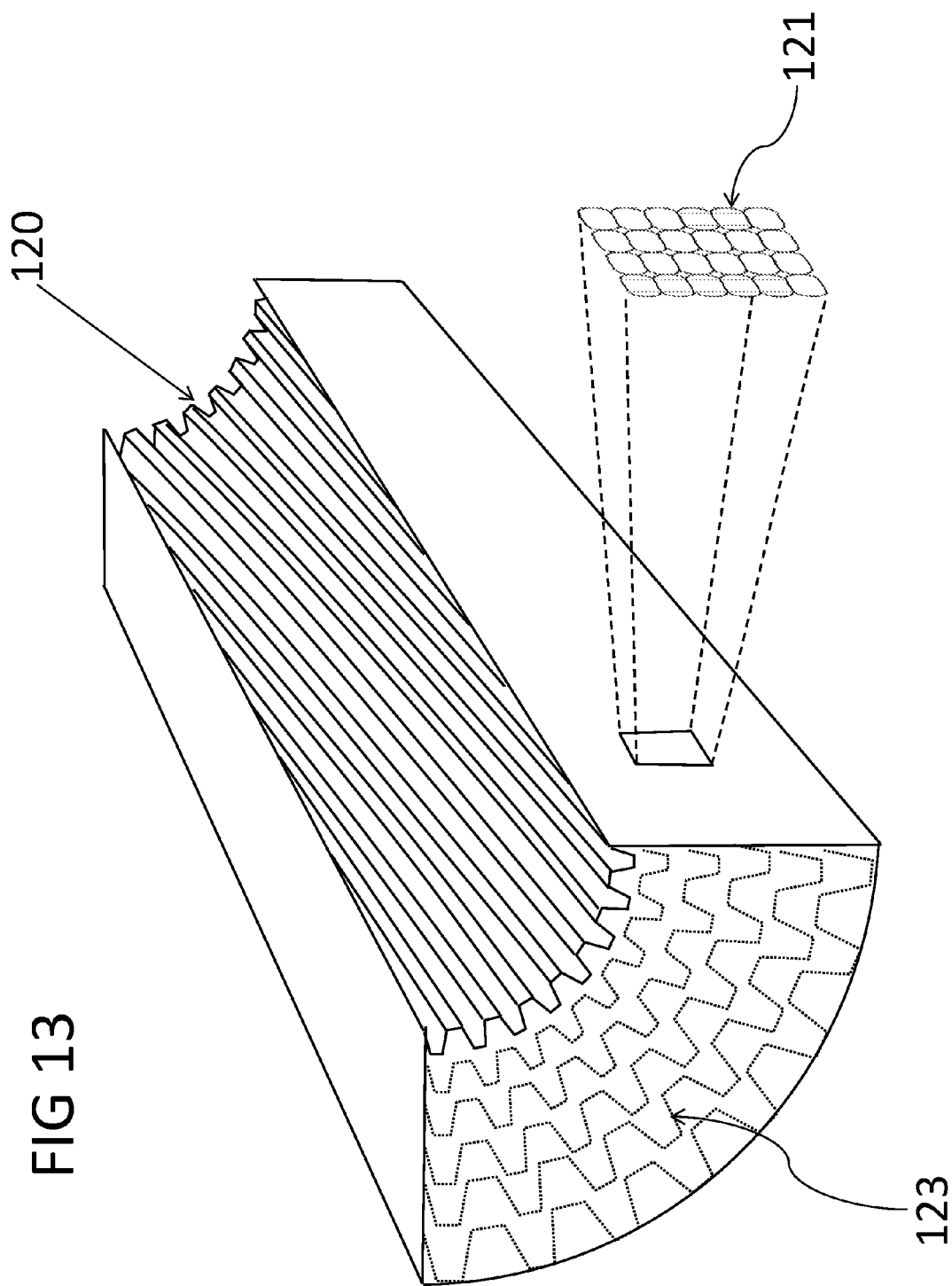

FIGS. 13 and 14 present two additional variations on the geometric pattern shown in FIGS. 1-3 and 11 and 12, illustrating a rifling pattern 120, 131 that serves to additionally induce vortex flow of oxidizer inside the center port with the objective of causing the oxidizer and fuel to spend more time mixing and combusting within the center port prior to exiting through the rocket nozzle thereby, encouraging more complete combustion.

In this exemplary embodiment, each fused stacked layer is formed with a series of fused concentric ring-shaped beads of solidified material featuring a pattern designed to increase surface area compared to a smooth construction and to present grooved, protrusion, or contoured patterns such that in its total construction, the center port wall features a rifling pattern designed to induce oxidizer vortex flow persisting throughout the hybrid rocket engine's operation as the fuel is consumed.

To achieve the various constructions described herein, the fused stacked layers 12 of the solid fuel grain section 10 are preferably manufactured using any one of many available additive manufacturing machines and techniques capable of fabricating articles in a material suitable as a hybrid rocket engine fuel.

There are many distinct forms of additive manufacturing in use today as well as many different types of materials available for processing by them as a hybrid rocket fuel that may be suitable for use in fabricating hybrid rocket fuel grains. For the exemplary examples shown in FIGS. 1-3 and 11-14B, the fused stacked layers of the solid fuel grain section 10 may be formed on a Fused Deposition Modeling (FDM) type additive manufacturing machine with sufficient build scale and capability to produce entire fuel grains or fuel grain sections which can be joined during post-processing to form a complete fuel grain. The FDM method of 3D printing machine technology, originally developed by Stratasys, Inc., Eden Prairie, Minn., today is considered a generic form and can be found under other trademarked processes such as Fused Filament Fabrication or Plastic Jet Printing. Examples of manufacturers of FDM type machines of sufficient scale meeting these criteria include: Cincinnati, Inc. of Harrison, Ohio; Stratasys, Inc., of Eden Prairie, Minn.; Cosine Additive, Inc., Houston, Tex.; and Thurmwood Corp., Dale, Ind.

In addition to FDM; there are a number of other additive manufacturing methods that can be employed to produce hybrid rocket fuel grains without departing from the spirit and scope of the present invention, including: Stereolithography, Selective Laser Sintering, Powder Bed Printing, and Inkjet Head Printing.

Materials available today for production in additive manufacturing machines suitable for hybrid rocket fuel are varied, with custom formulations now an option.

For the exemplary examples shown in FIGS. 1-3 and 11-14B, the fuel grain is fabricated in Acrylonitrile Butadiene Styrene (ABS), a thermoplastic possessing combustion characteristics desirable as a hybrid rocket engine fuel. With a Young's Modulus of 2.0-2.6 GPa, ABS is 460 times less elastic than HTPB and 38 times less elastic than paraffin wax, making it an ideal material for fabricating a hybrid rocket fuel grain and its combustion chamber center port.

Figure 4:
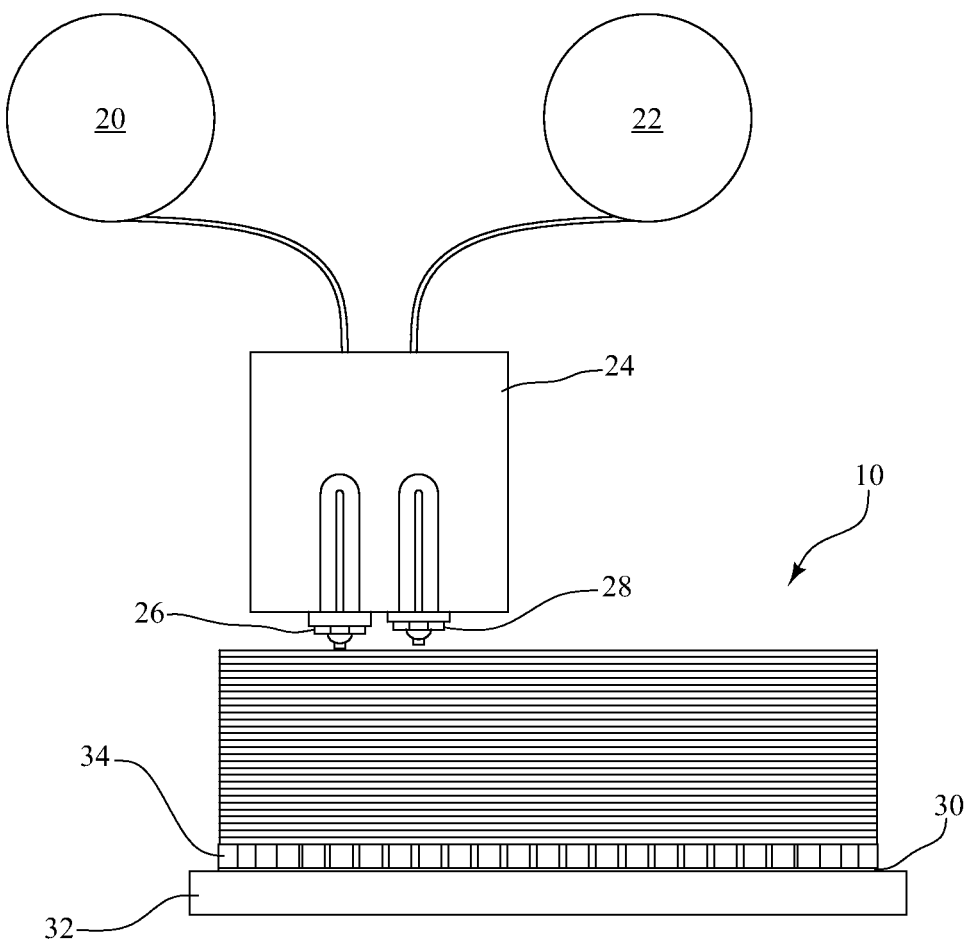
FIG. 4 is a view of an exemplary method for manufacturing the solid fuel grain section of FIG. 1.

Referring now to FIG. 4, in an exemplary method for manufacturing the solid fuel grain section 10, the FDM additive manufacturing process is performed in an additive manufacturing machine 10. The machine 10 comprises two cartridge mechanisms 20 and 22. One cartridge 20 stores a spool of ABS thermoplastic (in one embodiment) that is used for fabricating the solid fuel grain. The second cartridge 22 stores a spool of water-soluble disposable material that is used to separate the solid fuel grain section 10 from a support base and support any overhanging structures specified in the design.

However, other types of additive manufacturing technologies that operate differently may be employed without departing from the spirit of the present invention. For example, the BAAM™, a giant-scale additive manufacturing system produced by Cincinnati, Inc., Harrison, Ohio does not feature a disposable support material. Instead, a solvent sprayer is used to enable easy separation of the fuel grain from its base as well as any overhanging structures that are formed.

Once the additive manufacturing process has commenced, monofilament lines are spooled out from each cartridge 20, 22 and are fed into liquefiers (not shown) housed in a module 24, with the liquefiers heating the monofilament lines to their respective melting temperatures. The resulting liquefied ABS thermoplastic and support material is then forced through respective injection nozzles 26, 28 housed in the same module 24, so as to form small diameter concentric ring-shaped beads of material that are deposed upon the support base, in this example, a substantially flat plastic sheet 30.

In this regard, the module 24 housing the liquefiers and respective injection nozzles 26, 28 is robotically-controlled to allow for movement along two axes (X, Y) in a plane substantially parallel to the underlying plastic sheet 30. The plastic sheet 30 is mounted to a robotically-controlled elevator platform 32 that moves along an axis (Z) substantially perpendicular to the module 24 housing the liquefiers and respective injection nozzles 26, 28. Thus, the elevator platform 32 can drop a distance equal to the specified layer thickness after each successive layer has been formed.

Thus, the ABS thermoplastic material is extruded and placed to form each successive layer of concentric fused ring-shaped beaded structures according to the chosen design of the solid fuel grain section 10, with each successive layer being extruded and disposed upon the preceding layer. As each ring-shaped beaded structure cools and solidifies, a fusion bond develops between the concentric ring-shaped beaded structures, and as each plurality of such ring-shaped beaded structures forming layers cool and solidify, likewise a fusion bond develops between the layers.

Once the solid fuel grain section 10 is additively manufactured in this manner, and removed from the FDM additive manufacturing machine, any build support materials 34 can be either physically removed, or depending on the specific FDM type system employed, it can also be submersed into a water solution to dissolve any build support material.

The additively manufactured solid fuel grain section 10 has a substantially uniform fuel grain density and is substantially free of voids. Furthermore, hybrid rocket fuel grains produced in this manner will normally require only minimal post-processing surface treatment. It is important to note that many additive manufacturing systems capable of producing hybrid rocket fuel grains consistent with the spirit of the present invention employ different means to additively manufacture solid articles. For example, instead of using line filament, the Cincinnati BAAM uses thermoplastic feedstock in pellet form, similar to those used in injection molding. Stereolithography employs a bath of liquid photo curable polymer and a UV laser to trace the tool path on its surface to cause the material to solidify. Other additive manufacturing systems such as Selective Laser Sintering use a powder bed approach in which a fine layer of polymer powder is laid down to which a hot laser traces the tool path to solidify the material.

Figures 5A, 5B:
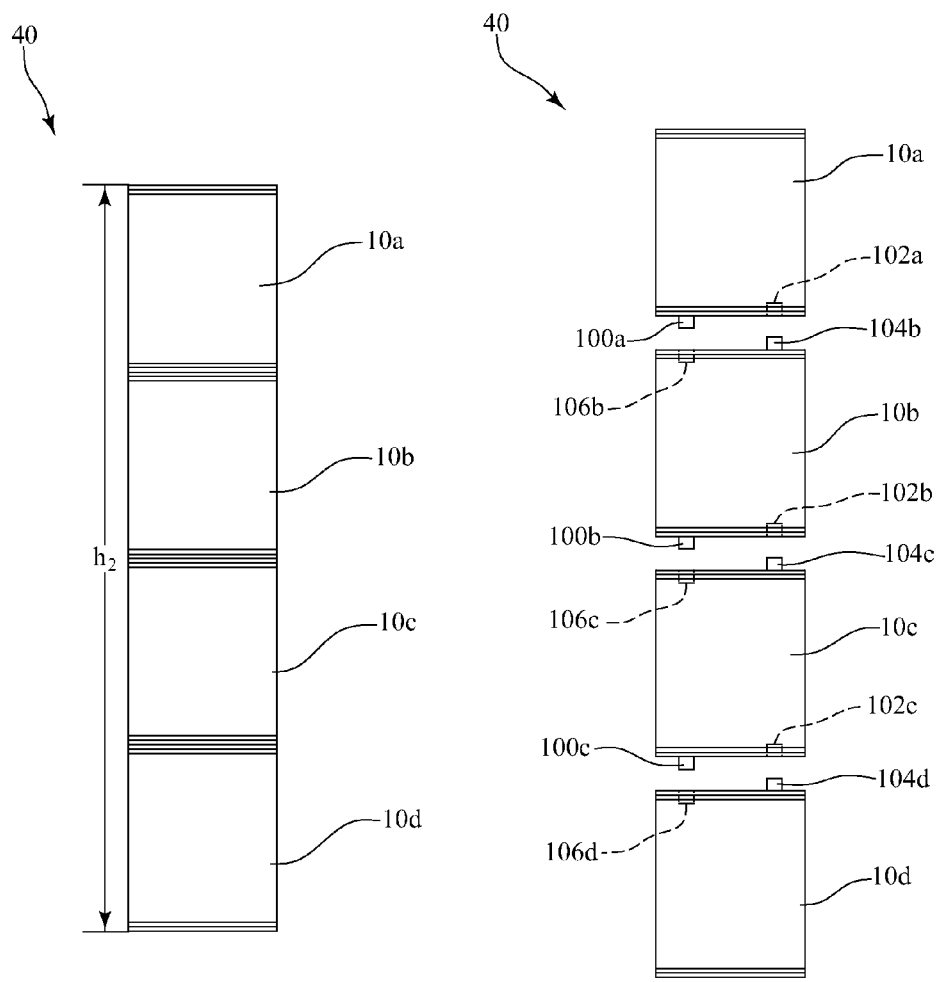
FIG. 5A is a side view of a solid fuel grain comprised of a plurality of solid fuel grain sections.
FIG. 5B is an exploded side view of the solid fuel grain of FIG. 5A.

Referring now to FIGS. 5A-5B, the individual fuel grain sections 10a, 10b, 10c, and 10d (multiple fuel gain sections) can be assembled and joined together from multiple separately fabricated sections to form a complete solid fuel grain 40 (also referred to as a multi-section fuel grain). In this exemplary embodiment, each solid fuel grain section 10 has a height, h1, of 23 inches, such that the overall height, h2, of the complete solid fuel grain 40 is 92 inches. Furthermore, in this exemplary embodiment, to ensure proper alignment, the topmost solid fuel grain 10a has at least one connecting member 100a extending from its lower surface and at least one cavity 102a defined in its lower surface for receiving a mating connecting member 104b. Similarly, the intermediate solid fuel grain sections 10b, 10c, each have at least one connecting member 100b and 100c, extending from their respective lower surfaces and one connecting member 104b, 104c, extending from their respective upper surfaces, and further each have at least one cavity 102b, 102c defined in their respective lower surfaces and at least one cavity 106b, 106c defined in their respective upper surfaces. Finally, the lowermost solid fuel grain section 10d has at least one connecting member 104b extending from its upper surface and at least one cavity 106d defined in its upper surface for receiving a mating connecting member 100c in the fuel grain section 10c.

Accordingly, when heated above its glass transition temperature ABS can be spread or sprayed on the upper and lower surfaces to create a strong fusion bond between the sections 10a, 10b, 10c, 10d during assembly. In this way, solid fuel grain sections 10a, 10b, 10c, 10d can be readily stacked, aligned, and mated to one another to form the complete solid fuel grain 40.

Figure 6:
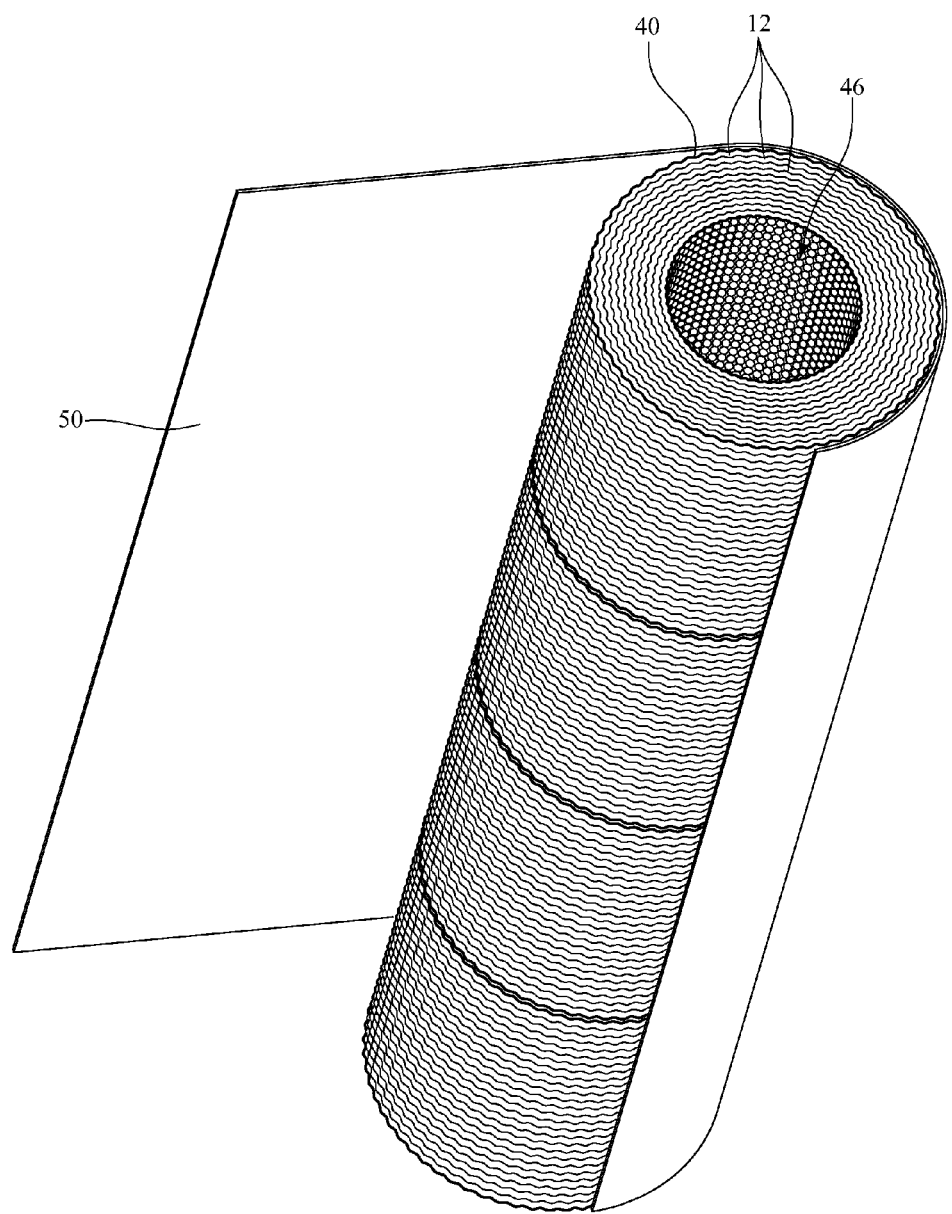
FIG. 6 is a perspective view of the plurality of solid fuel grain sections of FIG. 5A wrapped with insulating film.

Referring now to FIG. 6, after the solid fuel grain sections 10a, 10b, 10c, 10d are assembled, the solid fuel grain sections 10a, 10b, 10c, 10d collectively define a center port 46 through the solid fuel grain 40. The solid fuel grain 40 is preferably wrapped in a film 50 made of phenol or other suitable thermally resistant material. Placed between the inner wall of a fuel motor case (not shown in FIG. 6) and the outer surface of the solid fuel grain, the film 50 acts as an insulation layer to reflect heat and prevent damage to fuel motor cases made from either metal or non-metallic materials such as carbon fiber reinforced polymer composite. Once wrapped in the film 50, the solid fuel grain 40 can be placed into a motor case of a rocket.

Figure 7:
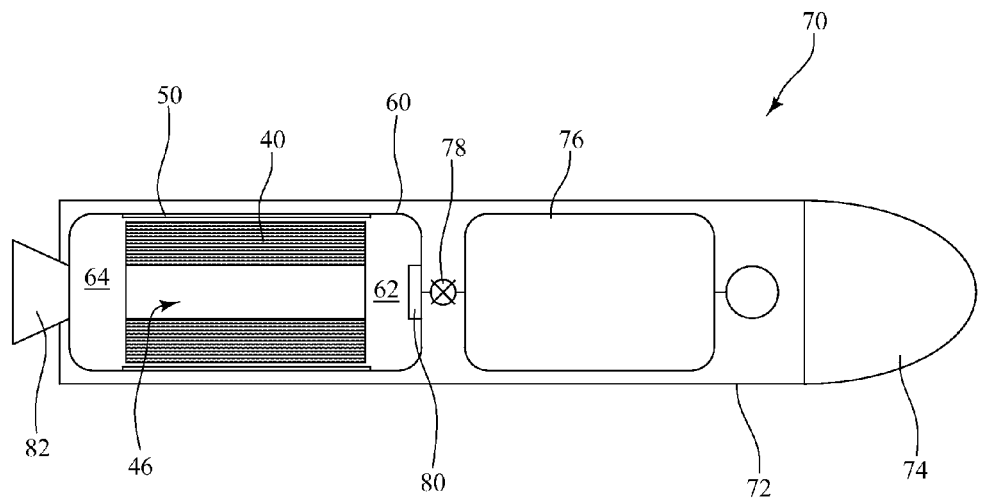
FIG. 7 is a sectional view of an exemplary rocket incorporating the solid fuel grain of FIGS. 5A, 5B, and 6.

FIG. 7 is a sectional view of an exemplary hybrid rocket engine 70 housed within an aeroshell 72 to form a complete hybrid rocket powered vehicle 70 incorporating the solid fuel grain 40 as described above with respect to FIGS. 5A, 5B, and 6. The exemplary hybrid rocket powered vehicle 70 generally comprises an aeroshell body 72, a nozzle 82 at one distal end of said aeroshell body 72, and a payload section 74 at an opposite distal end of said aeroshell body 72. Enclosed within the aeroshell body 72 of the hybrid rocket powered vehicle 70 is a hybrid rocket engine including an oxidizer tank 76, a valve 78, a motor case 60, and an oxidizer injector 80 housed typically within a forward cap (not shown) that also houses the ignition system (not shown). The motor case 60 houses a pre-combustion chamber (not shown), a post-combustion chamber 64, and the solid fuel grain 40, which as described above is wrapped in insulating film 50.

The solid fuel grain 40 wrapped in insulating film 50 can be "cartridge loaded" into the motor case 60 of the hybrid rocket engine. Alternatively, the exemplary solid fuel grain 40 wrapped in insulating film 50 could be wound with a fiber-reinforced polymer composite to form the motor case without departing from the spirit and scope of the present invention. In another exemplary embodiment, the solid fuel grain 40 can be inserted into a thermal protection cylinder fabricated from insulating material such as phenolic or cork without departing from the spirit and scope of the present invention. In yet another exemplary embodiment, the fuel grain 40 can be formed to embody either or both the pre-combustion chamber and the post-combustion chamber 64 without departing from the spirit and scope of the present invention.

Figure 8:
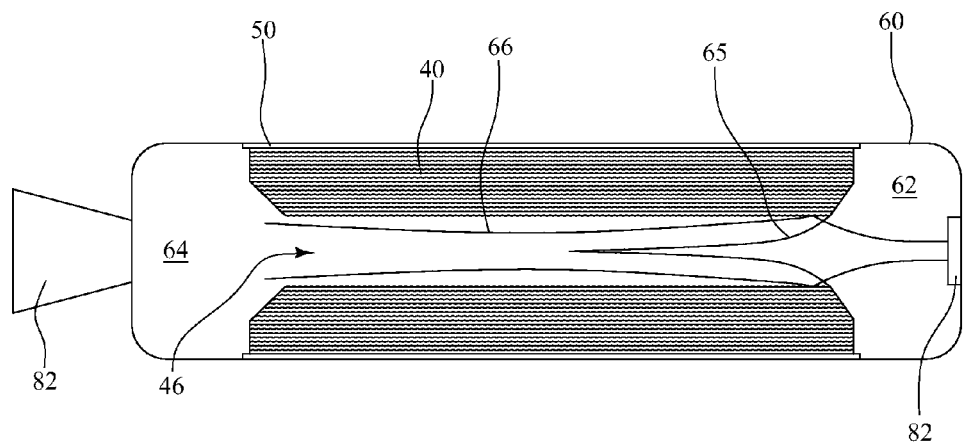
FIG. 8 is an enlarged sectional view of the motor case of the rocket of FIG. 7, showing a flame configuration.

FIG. 8 is an enlarged sectional view of the motor case 60 of the hybrid rocket powered vehicle 70 of FIG. 7, showing the flame zone within the fuel grain center port 46. As shown, an oxidizer 94 (either a liquid or a gas) is injected into the motor case 60 along a pathway defined by the center port 46 of the solid fuel grain 40 and flows within the center port 46, forming a boundary layer 65 bordered by the center port 46 wall. The boundary layer 65 is usually turbulent throughout a large portion of the length of the center port 46. Within the boundary layer 65 is a turbulent diffusion flame zone 66 that extends throughout the entire length of the center port 46 above the surface of the center port 46 wall, melting the exposed surface of the center port 46 wall and depending upon the characteristics of the solid fuel selected, either causing a phase change to a gas or entrained liquid droplets of fuel to form. Evaporation from the oxidizer/fuel gas or oxidizer gas/entrained liquid droplet interface produces a continuous flow of fuel gas that mixes with the oxidizer gas at the flame zone 66 to maintain combustion along the exposed surface area of the center port 46 wall. At steady state, the regression rate of the melt surface and the gas-gas or gas-entrained liquid droplet interface is the same, and the thickness of the gaseous or entrained liquid layer is constant.

Figure 9A:
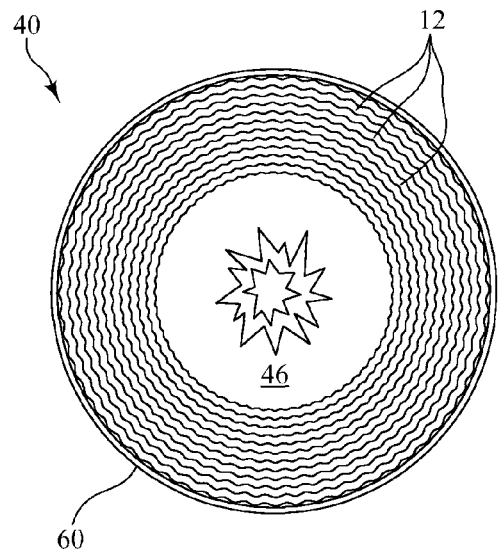
FIGS. 9A, 9B, and 9C are top views of the fuel grain section of FIG. 1 as successively consumed by a flame.
Figure 9B:
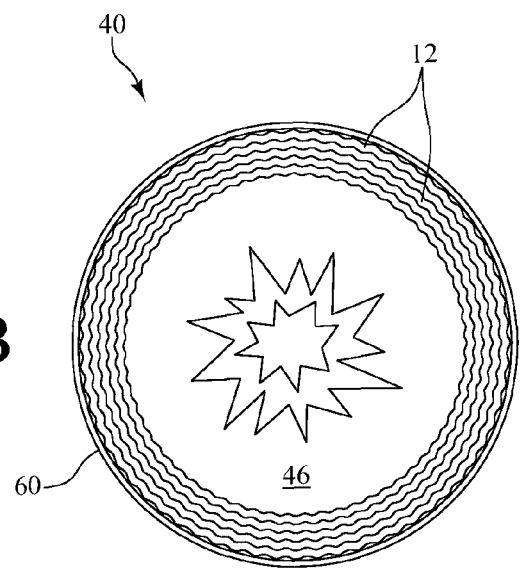
Figure 9C:
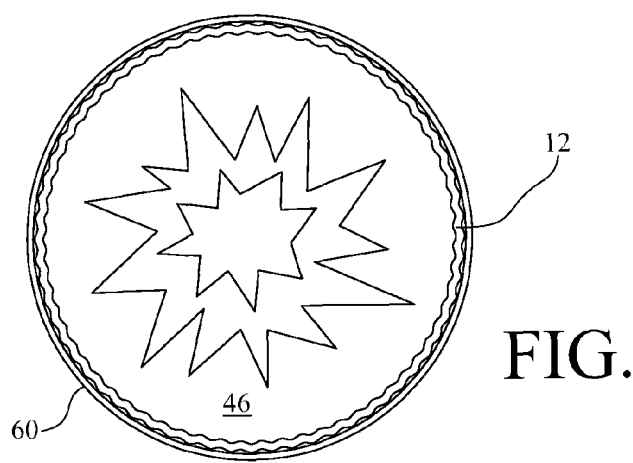

Because the additively manufactured port wall surface pattern 14, 91, 110, 120, 131 exposed to the flame zone 66 possesses increased surface area compared to cast-molded constructions, the exemplary solid fuel grain 40 causes increased regression rate and corresponding increased thrust impulse without the decreased fuel volumes associated with multi-port designs. Also, unlike the prior art constructions that increase the surface area through a multi-port architecture at the sacrifice of fuel loading, the solid fuel grain 40 of the present invention allows a smooth burning process whereby, as each concentric ring-shaped beaded structure forming each layer of the fusion stacked layer center port 46 wall is ablated, a new concentric ring-shaped beaded structure, the plurality of which forms the expanding center port 46 wall is presented to the flame zone 66, as shown in FIGS. 9A-9C, illustrating ablation of the center port wall at three different stages. This burning process continues until either oxidizer flow is terminated or the solid fuel grain 40 material is exhausted.

Figure 14A:
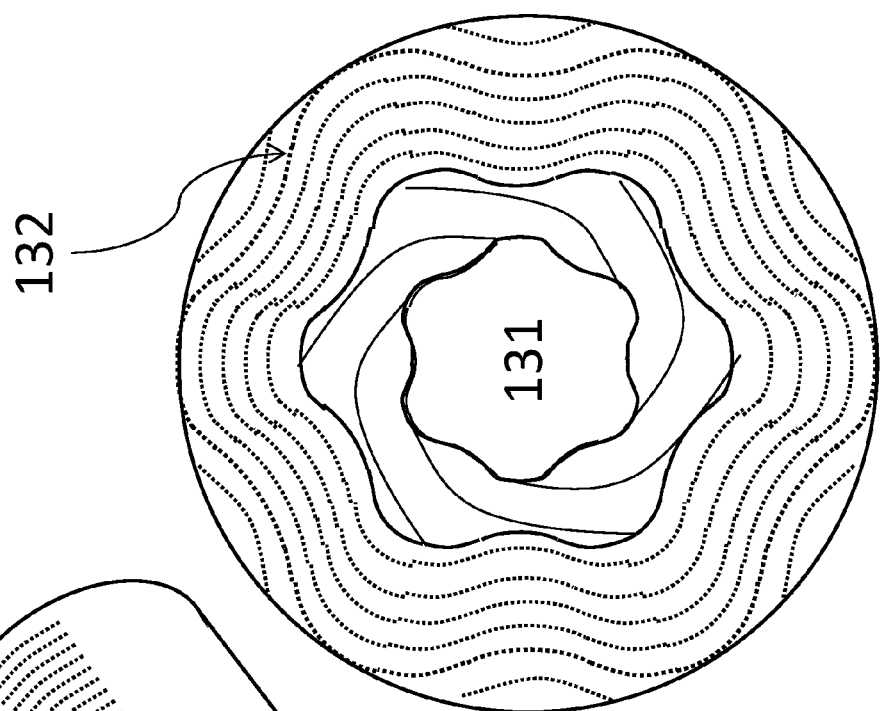
FIGS. 14A and 14B depict a top view and a perspective view of the fuel grain section of FIG. 1 featuring a concentric rifled polygonal topology grain pattern.
Figure 14B:
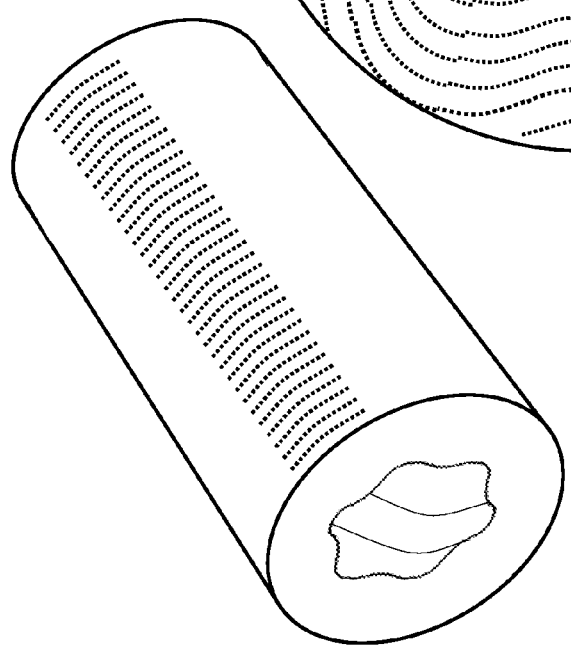

FIG. 10 depicts the coordinate system and orientation of the fuel grain for use with FIGS. 11-14B and depicts a preferred build orientation within the FDM additive manufacturing machine for fuel grains 93 (FIG. 11), 112 (FIG. 12), 122 (FIG. 13), and 133 (FIGS. 14A and 14B).

FIG. 11 is a quarter sectional view of the fuel grain section of FIG. 1 featuring a concentric ring-shaped corrugation build pattern or fuel grain 92, a port wall surface pattern 91, and several layers of fused concentric beads in cross section 90.

FIG. 12 is a quarter sectional view of the fuel grain section of FIG. 1 featuring a concentric ring-shaped truncated pyramidal build pattern or fuel grain 113, a port wall surface pattern 110, and several layers of fused concentric beads in cross section 111.

FIG. 13 is a quarter sectional view of the fuel grain section of FIG. 1 featuring a concentric ring-shaped rifled truncated pyramidal build pattern or fuel grain 123, a port wall surface pattern 120 with the build and surface patterns staggered layer by layer to form in its plurality a persistent rifling pattern.

FIG. 14A depicts a top view and FIG. 14B a perspective view showing the port wall surface pattern 131 of the fuel grain section of FIG. 1. FIGS. 14A and 14B feature a concentric ring-shaped rifled polygonal build pattern or fuel grain 132 with each such polygonal build pattern staggered and twisted (i.e., rifled) layer-by-layer to form in its plurality a persistent rifling pattern.

The embodiments of FIGS. 12-14B depict exemplary constructions of a hybrid rocket fuel grain engineered and additively manufactured to both increase the amount of surface area available for combustion as a means to improve regression rate, to improve specific impulse, and to reduce fuel waste by inducing oxidizer axial flow within the center port 46 (see FIG. 8) to allow more time for oxidizer and fuel gases (or oxidizer and entrained liquid droplets) to mix and combust more thoroughly.

The embodiments of FIGS. 13 and 14A/14B present a persistent rifling pattern to the oxidizer flowing through the center port 46 to induce axial flow.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A method of making a fuel grain for a hybrid rocket engine, the method comprising:

forming a first layer of grain material further comprising a plurality of concentric circular beaded ring-shaped structures of different radii fused together to form a cylindrically-shaped disc and defining a central opening therein;

forming a plurality of additional layers of grain material each comprising a plurality of concentric circular ring-shaped beaded structures of different radii fused together to form a cylindrically-shaped disc and defining a central opening therein;

the first layer and the plurality of additional layers of cylindrically shaped discs having a substantially equal outer and inner diameter or non-equal outer and inner diameter;

stacking and fusing the first layer and the additional layers together to form the fuel grain such that the central opening of the first layer and each of the additional layers is aligned to form a center combustion port extending through the fuel grain;

wherein the grain material includes at least one chemical component suitable for a hybrid rocket propulsion combustion reaction, each one of the plurality of concentric circular ring-shaped beaded structures of the first layer and each one of the plurality of concentric circular ring-shaped beaded structures of the additional layers having an outer circumference defining undulations therein and an inner circumference defining undulations therein; and wherein the undulations present a larger surface area available for combustion within the center combustion port and provide an increased regression rate of the fuel grain material relative to a fuel grain lacking such undulations.

2. The method of claim 1 wherein a material of each concentric circular ring-shaped beaded structure comprises a solidified material, further comprising a polymer or a solidified polymer-metal blend formulation.

3. The method of claim 1 wherein a material of each concentric circular ring-shaped beaded structure comprises Acrylonitrile Butadiene Styrene (ABS).

4. The method of claim 1 wherein a material of each concentric circular ring-shaped beaded structure comprises a blend of Acrylonitrile Butadiene Styrene (ABS) and aluminum powder.

5. The method of claim 1 wherein the steps of forming the first layer and forming the plurality of additional layers are performed on an additive manufacturing apparatus.

6. The method of claim 1 wherein the steps of forming the first layer and forming the plurality of additional layers are performed on a fused deposition modeling type machine.

7. The method of claim 1 wherein the steps of forming the first layer and forming the plurality of additional layers are performed by depositing a viscous polymer extruded along a circular or irregular closed path.

8. The method of claim 1 wherein a cross-sectional shape of each extruded ring-shaped bead of grain material comprises an elliptical shape having minor elliptical axis extending parallel to the center combustion port.

9. The method of claim 8 wherein the additive manufacturing apparatus allows placement of grain material in three dimensions.

10. The method of claim 1 wherein the plurality of undulations form a progressive twist through the center combustion port thereby forming a helical grooved rifling pattern of undulations to induce a swirling gaseous flow within the center combustion port.

11. The method of claim 1 wherein a shape of the center combustion port comprises a circular shape, an oval shape, a polygonal shape, a quatrefoil shape, a star shape, or an irregular shape.

12. The method of claim 1 wherein the center combustion port is polygonal in shape with each layer's orientation adjusted to create a progressive helical twist thereby, forming a rifling pattern to induce a swirling gaseous flow within the center combustion port.

13. The method of claim 1 wherein the undulations comprise one or more of a corrugation pattern, a truncated pyramidal pattern, a rifled truncated pyramidal pattern, or a rifled polygonal pattern.

14. The method of claim 1 wherein the plurality of fused concentric circular ring-shaped beaded structures forming a first layer and the fused concentric circular ring-shaped beaded structures forming additional layers, in their plurality forming a cylindrically shaped fuel grain has an outer diameter of about 19.0 inches and the center combustion port has an initial diameter of about 4 inches prior to consumption of the fuel grain material during a combustion process.

15. The method of claim 1 wherein the first layer and each one of the plurality of additional layers has a thickness of between about 0.005 inches and 0.25 inches.

16. The method of claim 1 further comprising a step of assembling multiple fuel grain sections into a complete multi-section fuel grain.

17. Forming a fuel grain segment according to the method of claim 1 further comprising vertically orienting a plurality of the fuel grain segments and disposing viscous ABS material between a lower surface of a first fuel grain segment and an upper surface of an abutting second fuel grain segment to fusion bond the first and second segments.

18. The method of claim 1 wherein the first layer and the plurality of additional layers are substantially uniform in material composition.

19. A method of constructing a hybrid rocket fuel grain comprising steps of:
  (a) using an additive manufacturing process, forming a first layer of oxidizer free grain material;
  (b) forming a succession of additional layers of oxidizer free grain material, each successive layer bonded to an adjacent layer; and
  (c) abutting the fuel grain to the rocket nozzle or post-combustion chamber;
  wherein the oxidizer free grain material includes at least one chemical component suitable for a hybrid rocket propulsion combustion reaction, the layers forming a fuel grain having at least one combustion port;
  wherein each of the first layer and the additional layers comprises a plurality of fused concentric circular ring-shaped beaded structures each forming a cylindrically shaped disc of substantially equal outer and inner diameter, laterally stacked and bonded together to form a hybrid rocket fuel grain with each layer defining undulations therein; and
  wherein the pattern of undulations presents a center port wall presenting a larger surface area available for combustion and as each concentric circular ring-shaped beaded structure is consumed during combustion, the next outer concentric circular ring-shaped beaded structure is revealed and available for combustion, thus producing an increased regression rate of the fuel grain relative to a fuel grain lacking such pattern of undulations.

* * * * *